United States Patent
Theis et al.

(10) Patent No.: US 7,437,405 B1
(45) Date of Patent: Oct. 14, 2008

(54) SYSTEM AND METHOD FOR MANAGING DATA OBJECTS IN A WIRELESS DEVICE

(75) Inventors: Ronald L. A. Theis, Palo Alto, CA (US); Philip A. Myles, Hayward, CA (US)

(73) Assignee: Danger, Inc., Palo Alto, CA (US)

( * ) Notice: Subject to any disclaimer, the term of this patent is extended or adjusted under 35 U.S.C. 154(b) by 723 days.

(21) Appl. No.: 10/263,147

(22) Filed: Oct. 1, 2002

(51) Int. Cl.
G06F 15/16 (2006.01)
G06F 15/173 (2006.01)
H04L 12/58 (2006.01)

(52) U.S. Cl. ............... 709/203; 709/217; 709/226; 455/412.1

(58) Field of Classification Search ............... 709/203, 709/217, 226; 705/26; 370/352; 455/428, 455/412.1
See application file for complete search history.

(56) References Cited

U.S. PATENT DOCUMENTS

| | | |
|---|---|---|
| 5,126,786 A | 6/1992 | Tanaka |
| 5,159,592 A | 10/1992 | Perkins |
| 5,436,960 A | 7/1995 | Campana, Jr. et al. |
| 5,517,387 A | 5/1996 | Smith |
| 5,559,800 A | 9/1996 | Mousseau et al. |
| 5,594,910 A | 1/1997 | Filepp et al. |
| 5,625,670 A | 4/1997 | Campana, Jr. et al. |
| 5,631,946 A | 5/1997 | Campana, Jr. et al. |
| 5,727,202 A | 3/1998 | Kucala |
| 5,778,176 A | 7/1998 | Geihs et al. |
| 5,790,974 A | 8/1998 | Tognazzini |
| 5,802,312 A | 9/1998 | Lazaridis et al. |
| 5,819,172 A | 10/1998 | Campana, Jr. et al. |
| 5,915,095 A | 6/1999 | Miskowiec |
| 5,961,590 A | 10/1999 | Mendez et al. |
| 5,964,830 A | 10/1999 | Durrett |
| 6,023,708 A | 2/2000 | Mendez et al. |
| 6,035,104 A | 3/2000 | Zahariev |

(Continued)

FOREIGN PATENT DOCUMENTS

WO    WO 98/36344    8/1998

(Continued)

OTHER PUBLICATIONS

"SyncML Representation Protocol, version 1.0" SyncML Representation Protocol, Dec. 7, 2000, pp. 1-104. XP002217062.

(Continued)

Primary Examiner—Saleh Najjar
Assistant Examiner—Vitali Korobov
(74) Attorney, Agent, or Firm—Blakely, Sokoloff, Taylor & Zafman, LLP (57) ABSTRACT

A system and method of managing objects in a wireless user terminal is described. When an object is created or added to a user terminal, the user terminal assigns a temporary ID to the object. The wireless user terminal can also be coupled to a server by a network. The object or a copy of the object and the object's temporary ID can also be transferred to the server. The server can then assign a permanent ID to the object. The permanent ID of the object can also be transferred to the wireless user terminal.

30 Claims, 8 Drawing Sheets

U.S. PATENT DOCUMENTS

| | | | |
|---|---|---|---|
| 6,035,339 | A | 3/2000 | Agraharam et al. |
| 6,067,451 | A | 5/2000 | Campana, Jr. et al. |
| 6,076,109 | A | 6/2000 | Kikinis |
| 6,134,539 | A | 10/2000 | Alexander et al. |
| 6,151,643 | A | 11/2000 | Cheng et al. |
| 6,151,677 | A | 11/2000 | Walter et al. |
| 6,157,935 | A | 12/2000 | Tran et al. |
| 6,166,734 | A | 12/2000 | Nahi et al. |
| 6,167,441 | A | 12/2000 | Himmel |
| 6,188,752 | B1 | 2/2001 | Lesley |
| 6,199,099 | B1 | 3/2001 | Gershman et al. |
| 6,233,318 | B1 | 5/2001 | Picard et al. |
| 6,289,212 | B1 | 9/2001 | Stein et al. |
| 6,308,201 | B1 | 10/2001 | Pivowar et al. |
| 6,317,592 | B1 | 11/2001 | Campana, Jr. et al. |
| 6,324,691 | B1 | 11/2001 | Gazdik |
| 6,330,618 | B1 | 12/2001 | Hawkins |
| 6,370,687 | B1 | 4/2002 | Shimura |
| 6,396,482 | B1 | 5/2002 | Griffin et al. |
| 6,418,310 | B1 | 7/2002 | Dent |
| 6,449,622 | B1 | 9/2002 | LaRue et al. |
| 6,587,462 | B2 | 7/2003 | Mahalingaiah |
| 6,622,175 | B1 | 9/2003 | Piller |
| 6,728,685 | B1 * | 4/2004 | Ahluwalia ................ 705/26 |
| 6,785,534 | B2 | 8/2004 | Ung |
| 6,847,632 | B1 * | 1/2005 | Lee et al. ................. 370/352 |
| 6,980,963 | B1 * | 12/2005 | Hanzek .................... 705/26 |
| 7,076,736 | B2 * | 7/2006 | Hugh ....................... 715/743 |
| 7,136,635 | B1 | 11/2006 | Bharatia et al. |
| 2001/0056508 | A1 | 12/2001 | Arneson et al. |
| 2002/0032768 | A1 | 3/2002 | Voskuil |
| 2002/0083035 | A1 | 6/2002 | Pearl et al. |
| 2002/0103935 | A1 | 8/2002 | Fishman et al. |
| 2002/0132609 | A1 | 9/2002 | Lewis et al. |
| 2002/0194279 | A1 | 12/2002 | Chern |
| 2003/0032417 | A1 | 2/2003 | Minear et al. |
| 2003/0055902 | A1 | 3/2003 | Amir et al. |
| 2003/0081591 | A1 | 5/2003 | Cheung et al. |
| 2003/0088693 | A1 | 5/2003 | Cheung et al. |
| 2003/0167230 | A1 | 9/2003 | McCarthy |
| 2003/0181242 | A1 | 9/2003 | Lee |
| 2003/0182380 | A1 | 9/2003 | Yabe et al. |
| 2004/0077347 | A1 * | 4/2004 | Lauber et al. ............ 455/428 |
| 2004/0082323 | A1 | 4/2004 | Smith |
| 2004/0090950 | A1 * | 5/2004 | Lauber et al. ............ 370/352 |
| 2004/0199663 | A1 | 10/2004 | Horvitz et al. |
| 2005/0144251 | A1 | 6/2005 | Slate |

FOREIGN PATENT DOCUMENTS

| | | | |
|---|---|---|---|
| WO | WO 99/06929 | 2/1999 | |
| WO | WO 00/30003 | 5/2000 | |

OTHER PUBLICATIONS

Jonsson, A., et al., "SyncML—Getting the Mobile Internet IN Sync", Ericsson Review (Incl. on), No. 3, 2001, pp. 110-115, XP001081067. ISSN: 0014-0171.

Foreign Counterpart Communication Related European Application No. 03755872.3-2201, mailed Sep. 19, 2007, 6 pgs.

Arib Standard, "Discussion of Synchronization Standards", (Release 4), Mar. 2001, pp. 1-12, XP002276574.

Foreign Counterpart Related European Application No. 03755872. 3-2201 European Supplementary Search Report, mailed Sep. 26, 2006, 4 pgs.

Meggers, J., et al., "A multimedia communication architecture for handheld devices," Personal Indoor And Mobile Radio Communications, 1998. Sep. 8-11, 1998, IEEE, pp. 3 double-sided.

Bergzen H, "Project Status And System Architecture Of An Automated HF System To Be Used By The Swedish Armed Forces," Oct. 28, 2001 IEEE Military Communications Conference, pp. 4 double-sided.

Excite Home Page, http://www.excite.com/, 1page Aug. 1, 2000.

Alta Vista Home Page, http://www.altavista.com/, 1 page Aug. 1, 2000.

Yahoo Home Page, http://www.yahoo.com/, 1 page Aug. 1, 2000.

Anita Komlodi, Key Frame Preview Techniques For Video Browsing, Digital Library Research Group, College of Library and Information Services University of Maryland, pp. 118-125.

Appenzeller, et al., "User-Friendly Access Control For Public Network Posts", IEEE, pp. 699-707, Mar. 1999.

Clausen, L., et al., "Java bytecode compression for embedded systems" Technical Report No. 1213, Institut de Recherche en Informatique et Systemems Aleatoires, 1998.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting To Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances" 1999 IEEE Global Telecommunications Conference Globecom 1999, Seamless Interconnection For Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference On World Wide Web, May 11, 1999, pp. 1-14, XP002163485.

"CC/PP Attribute Vocabularies" W3C Jul. 21, 2000, XP002218349.

* cited by examiner

SYSTEM AND METHOD FOR MANAGING DATA OBJECTS IN A WIRELESS DEVICE

FIELD OF THE INVENTION

The present invention relates to data storage and exchange and more specifically to a system and method for storing and exchanging data between a wireless computing device and a host computer such as a server.

BACKGROUND OF THE INVENTION

There are many types of data processing devices including computer terminals, wireless personal digital assistants ("PDAs") and network servers. Data objects such as calendar entries, e-mail messages and data objects are frequently shared between two or more data processing devices. When a copy of a particular data object is stored on both a computer terminal and a server that serves the computer terminal, for example, the stored data object can be independently modified (i.e. edited, added, deleted, moved, . . . etc) on both the computer terminal and the server. Commonly, after the data object is modified on the computer terminal, the data object is then transmitted back to the server to be stored in place of the original data object, so that the copy of the data object remains up-to-date on both the computer terminal and the server.

One technique for ensuring that the data object on the server is synchronized with the data object on the computer terminal is for the server to assign a unique data object ID to each original data object when the server initially stores the data object. Subsequently, when the computer terminal retrieves the data object, the retrieved data object includes the unique data object ID. If the data object is modified at the computer terminal and transmitted back to the server, as described above, the data object is identified by the server with the same unique data object ID.

Another data sharing technique reduces network data traffic by sending only the actual edits (i.e., the difference between the original data object and the edited data object) rather than the complete, edited data object between the computer terminal and the server. For example, the computer terminal retrieves and edits a data object from the server which is identified with a particular data object ID. The data object is then edited at the computer terminal (e.g., by deleting the third line and changing the third word in the second line from "less" to "more"). The actual edits (i.e. delete the third line and replace the third word in the second line from "less" to "more") and the data object ID of the document data object are then sent to the server. The server then executes the modifications to the data object with the same data object ID stored on the server.

The actual network bandwidth of the computer network is often limited to the lowest bandwidth of the any one portion of the network connecting the computer terminal and the server. For example, if the server is linked to the computer terminal via a 14.4 kbps wireless connection, then the maximum through put to the computer terminal is 14.4 kbps even though some portions of the network may have a wider bandwidth (e.g., a 1.4 Mbit T1 line, 10 Mbit Ethernet, . . . etc).

In addition, certain wireless networks suffer frequent interruptions due to radio frequency interference and lack of network coverage. A wireless network connection may be interrupted, for example, if the wireless data processing device passes through a tunnel or some other obstruction or into an area without wireless network coverage. Because the wireless network may be interrupted and may often have a relatively low bandwidth, it is important to minimize the data traffic across the wireless network.

Figure 1:
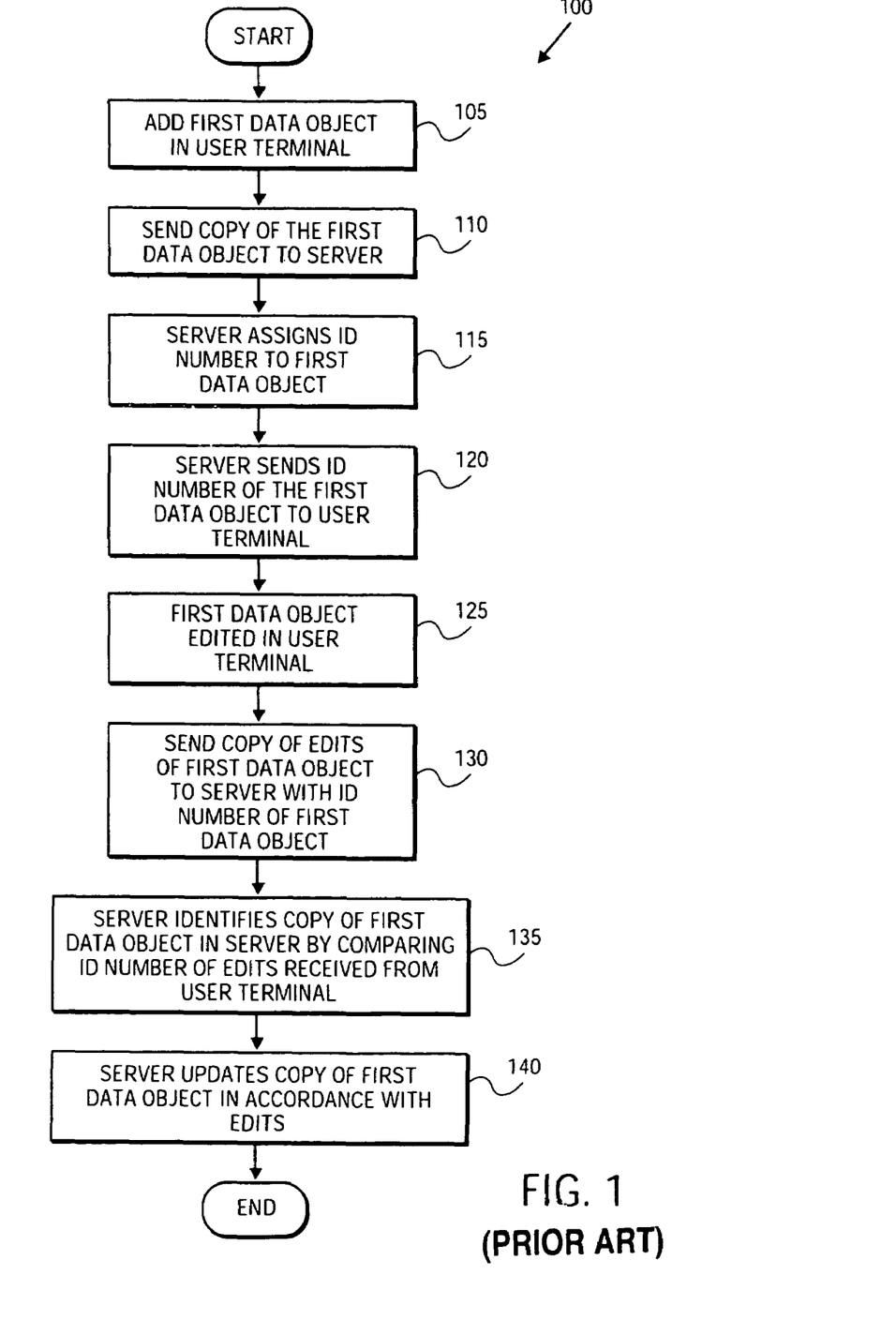
FIG. 1 shows a prior art process where a data object is added to a computer terminal such as a wireless user terminal.

FIG. 1 shows a prior art process where a data object is added to a computer terminal such as a wireless user terminal in block 105. A copy of the data object is sent to the server in block 110. The server then assigns an ID to the data object in block 115. The server sends the data object ID back to the user terminal so that the user terminal can identify that data object. As discussed above, the data object ID code allows the user terminal and the server to refer to the correct data object by the assigned ID.

In a block 125, the data object is edited in the user terminal. In block 130, a copy of the edits are sent to the server along with the data object ID. The server uses the ID to properly identify and edit the data object and then updates the correct data object according to the edits, in block 140.

SUMMARY OF THE INVENTION

A system and method for managing objects in a wireless user terminal are described. When an object is created or added to a user terminal, the user terminal assigns a temporary ID to the object. The wireless user terminal can also be coupled to a server by a network. The object or a copy of the object and the object's temporary ID can also be transferred to the server. The server can then assign a permanent ID to the object. The permanent ID of the object can also be transferred to the wireless user terminal.

BRIEF DESCRIPTION OF THE DRAWINGS

The present invention is illustrated by way of example and not limitation in the figures of the accompanying drawings in which like references indicate similar elements.

DETAILED DESCRIPTION

A system and method for managing data objects in a wireless device is described below. In one embodiment, when a data object is created in a wireless device, the wireless device identifies the data object with a temporary ID code. The data object and corresponding temporary ID are uploaded to the server. The server then assigns a permanent ID to the data object. The temporary ID is also recorded with the corresponding permanent ID. In one embodiment, at the next available opportunity, the permanent ID and the temporary ID are transmitted from the server to the user terminal.

In one embodiment, the temporary ID number is a unique number such as a time stamp or a negative time stamp. For example the time stamp could be the number of seconds since 12:01:00 am, Jan. 1, 2001.

One of the problems that can occur is that the permanent ID for the data object is not received by the user terminal in a timely fashion. The permanent ID may not be received in a timely fashion for many reasons such as network outages or network interruptions or other reasons that the user terminal cannot connect to the server.

The wireless device/user terminal may be a wireless personal digital assistant ("PDA") or similar computing device. The PDA can be used to generate and store various types of data objects including, but not limited to address book entries, e-mail messages, calendar entries, files of various file types (e.g., Word documents), and memos. When the PDA establishes a connection to a host computer such as a server, the various data objects are uploaded to the host computer. The PDA may be used for extended periods before connecting to the host computer and therefore the data objects created in or added to the PDA may also be edited. For example, a new memo (memo1) may be created in the PDA. When memo1 is completed, a copy of memo1 is placed in a "drop box" in the PDA or otherwise designated for sending to the host computer when the PDA establishes a connection to the host computer. In one embodiment, the drop box is a temporary memory location such as a memory buffer. At a later time, but before the PDA is connected to the host computer, memo1 may be further edited on the PDA. The memo1 edits are also placed in the drop box or otherwise designated for sending to the host computer. When the PDA and the host computer are next connected, the copy of the memo1 and the copy of the memo1 edits are transferred from the PDA to the host computer. However, the host computer may not be able to identify the correct data object to be edited because memo1 has not yet been assigned a permanent ID and the edits sent by the PDA therefore are not identified by a permanent data object ID.

In one embodiment, the PDA (or other user terminal) assigns a temporary ID when memo1 is designated for download to the host computer. In addition, the subsequent edits to memo1 are also assigned the temporary ID. When the PDA and the host computer are next connected, the copy of memo1, the memo1 temporary ID, the memo1 edits and the associated temporary ID are transferred from the PDA to the host computer. The host computer assigns a permanent ID to memo1 and records the corresponding temporary ID with the permanent ID. The host identifies the correct data object to be edited by determining that the memo1 edits include a temporary ID which corresponds to a permanent ID identifying the memo1 data object. The host computer can also transfer the corresponding permanent and temporary IDs to the PDA so that the PDA can re-identify memo1 with the correct, permanent ID in the PDA. The PDA may then use the permanent ID for future data object modifications.

Figure 2:
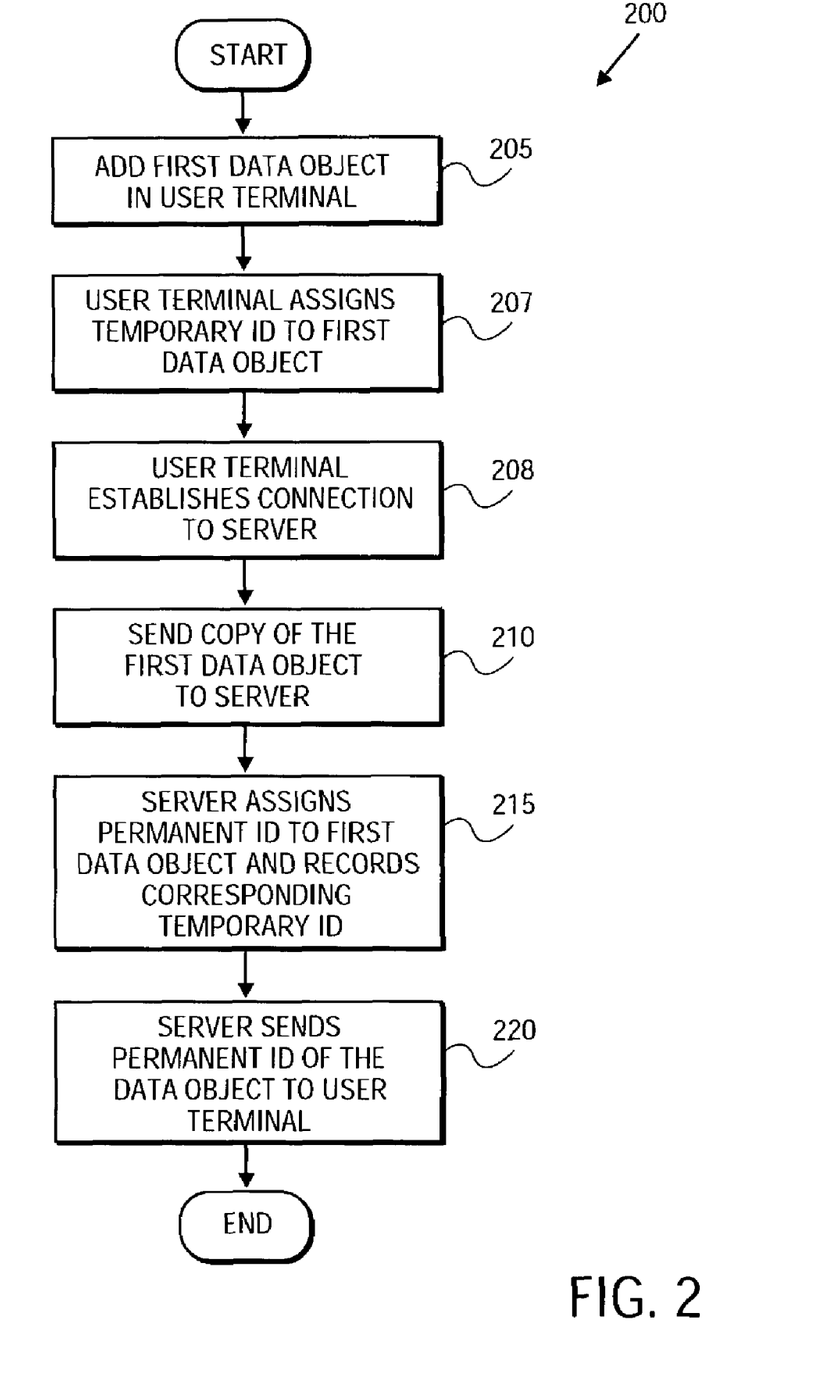
FIG. 2 illustrates one embodiment of a process for managing an object in a user terminal.

FIG. 2 illustrates one embodiment of a process for managing a data object (e.g., a data object) in a shared network environment. The data object is added to a user terminal in block 205. In block 207, the user terminal assigns a temporary ID to the data object. In block 208, the user terminal establishes a connection to the server and, in block 210, sends a copy of the data object to the server. In block 215, the server assigns a permanent ID to the data object and also records the corresponding temporary ID. The server then sends the permanent ID and the corresponding temporary ID of the data object to the user terminal, in Block 220.

Figure 2A:
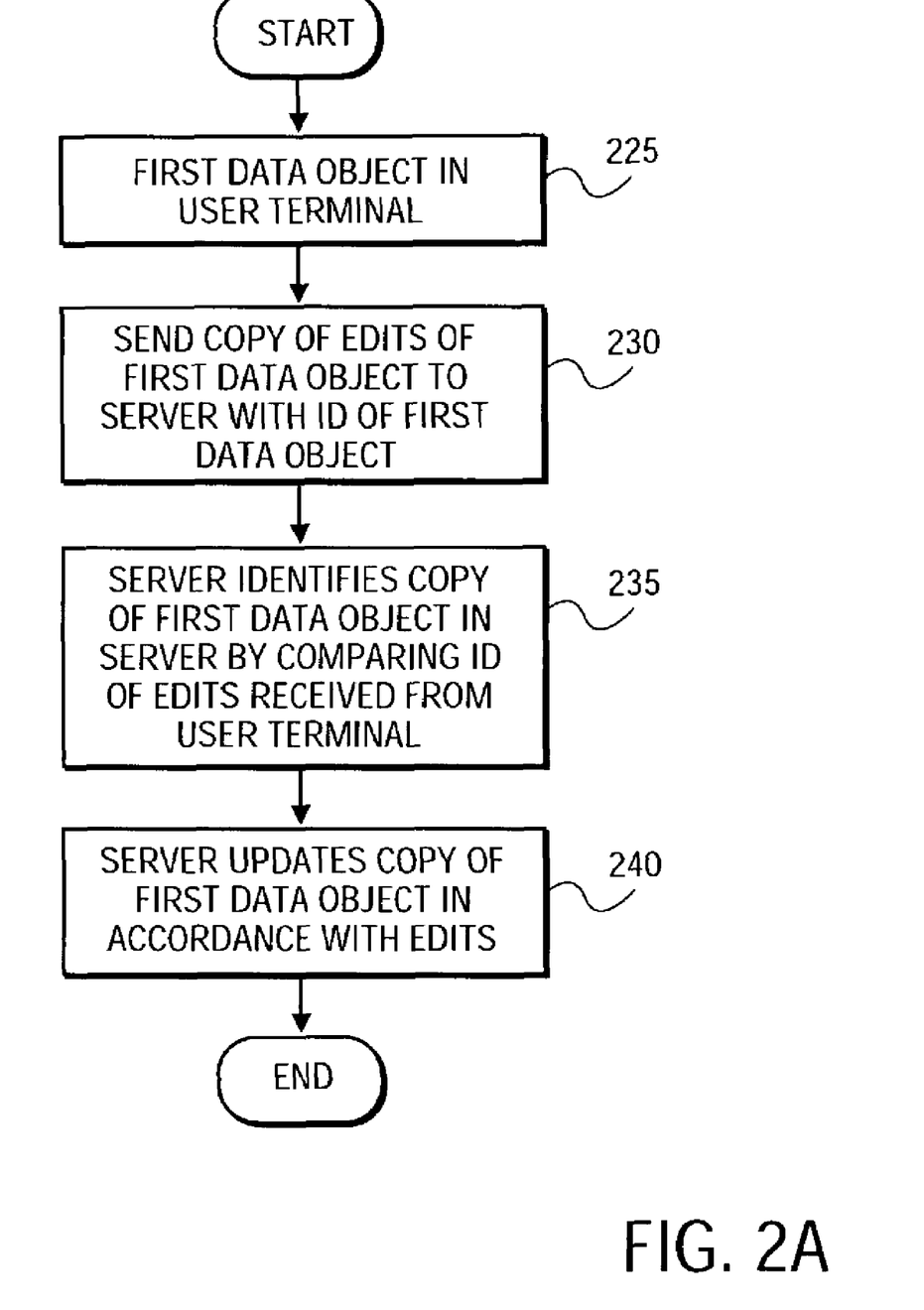
FIG. 2A shows one embodiment of a process for editing a data object in the user terminal after the data object has been assigned a permanent data object ID by the server.

FIG. 2A illustrates one embodiment of a process for editing a data object in the user terminal after the data object has been assigned a permanent data object ID by the server. In a block 225, the data object is edited in the user terminal. Then, in block 230, a copy of the edits are transferred to the server along with the data object ID. The server then identifies the correct data object among the many data objects that may be stored in the server using the data object ID. The server updates the correct data object according to the edits, in block 240. Alternatively, a copy of the entire edited data object, with the data object ID can be sent to the server. The server can then identify and replace the correct data object.

Figure 2B:
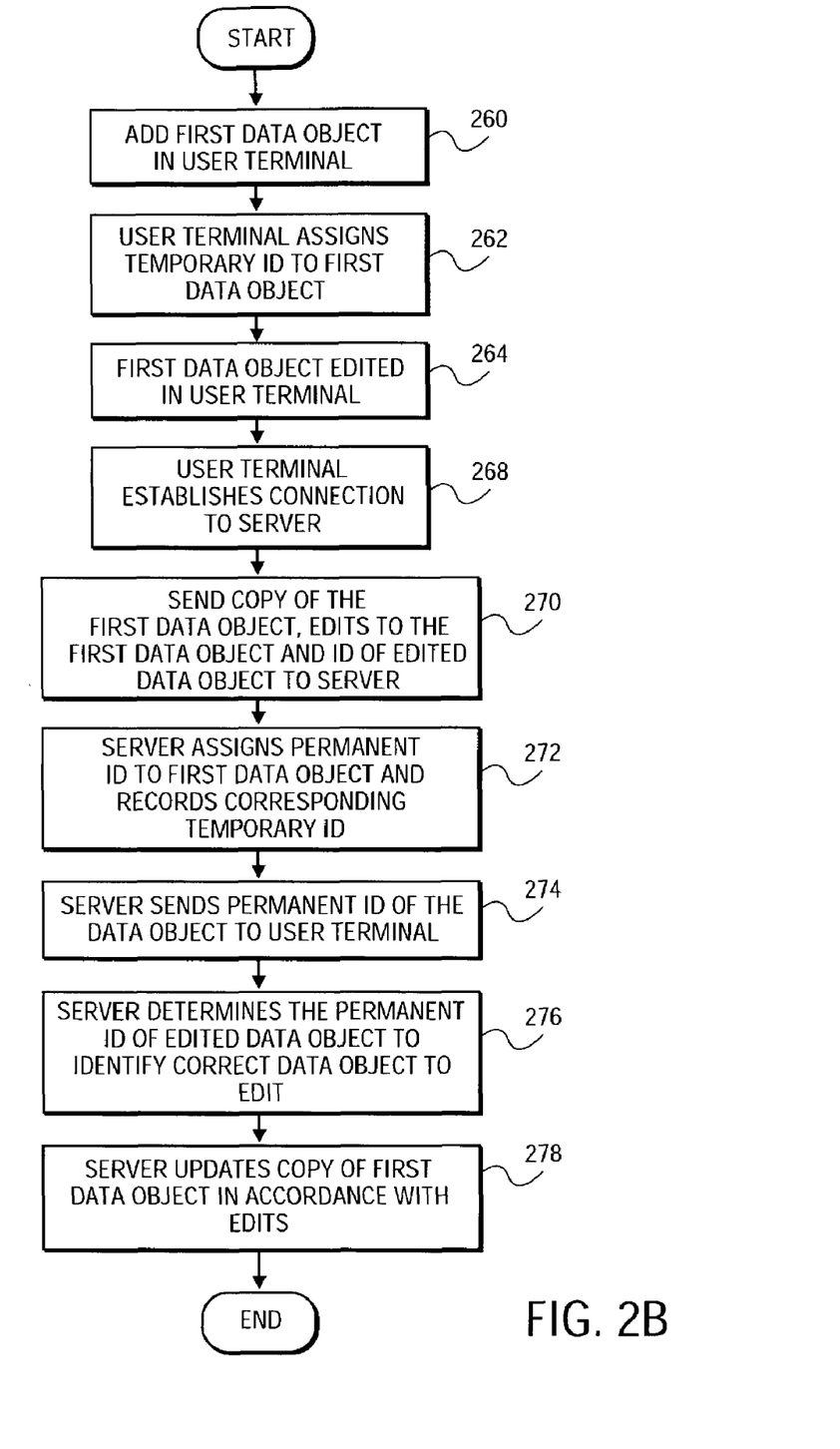
FIG. 2B shows an alternative embodiment of a process of editing a data object before the server assigns a permanent ID to the data object.

FIG. 2B shows an alternative embodiment of a process of editing a data object before the server assigns a permanent ID to the data object. A data object is added or created in a user terminal in block 260. In block 262, the user terminal assigns a temporary ID to the data object. In block 264, the data object is edited in the user terminal. In block 268, the user terminal establishes a connection to the server. A copy of the data object and the temporary ID of the data object are then transmitted to the server followed by the edits and the temporary ID associated with the edits in block 270.

In block 272, the server assigns a permanent ID to the added data object and also records the corresponding temporary ID to the data object. The server then sends the permanent ID and the corresponding temporary ID of the data object to the user terminal, in Block 274. The server determines the correct data object to which to apply the edits in block 276. In one embodiment, the server determines the correct data object by comparing the IDs. The server then edits the correct data object according to the edits, in block 278.

The temporary ID in one embodiment is a timestamp or some other unique number. One way to ensure that the temporary ID is a unique number is to use a timestamp, such as the number of seconds since 12:01:00 am, Jan. 1, 2001. In one embodiment, the temporary ID is a negative number and the permanent ID is a positive number, so that the server can readily differentiate a permanent ID from a temporary ID. In another embodiment, the permanent ID and the temporary are ID are provided with different formats. For example, the temporary ID may be numeric and the permanent may be alphabetic or alphanumeric.

Figure 3:
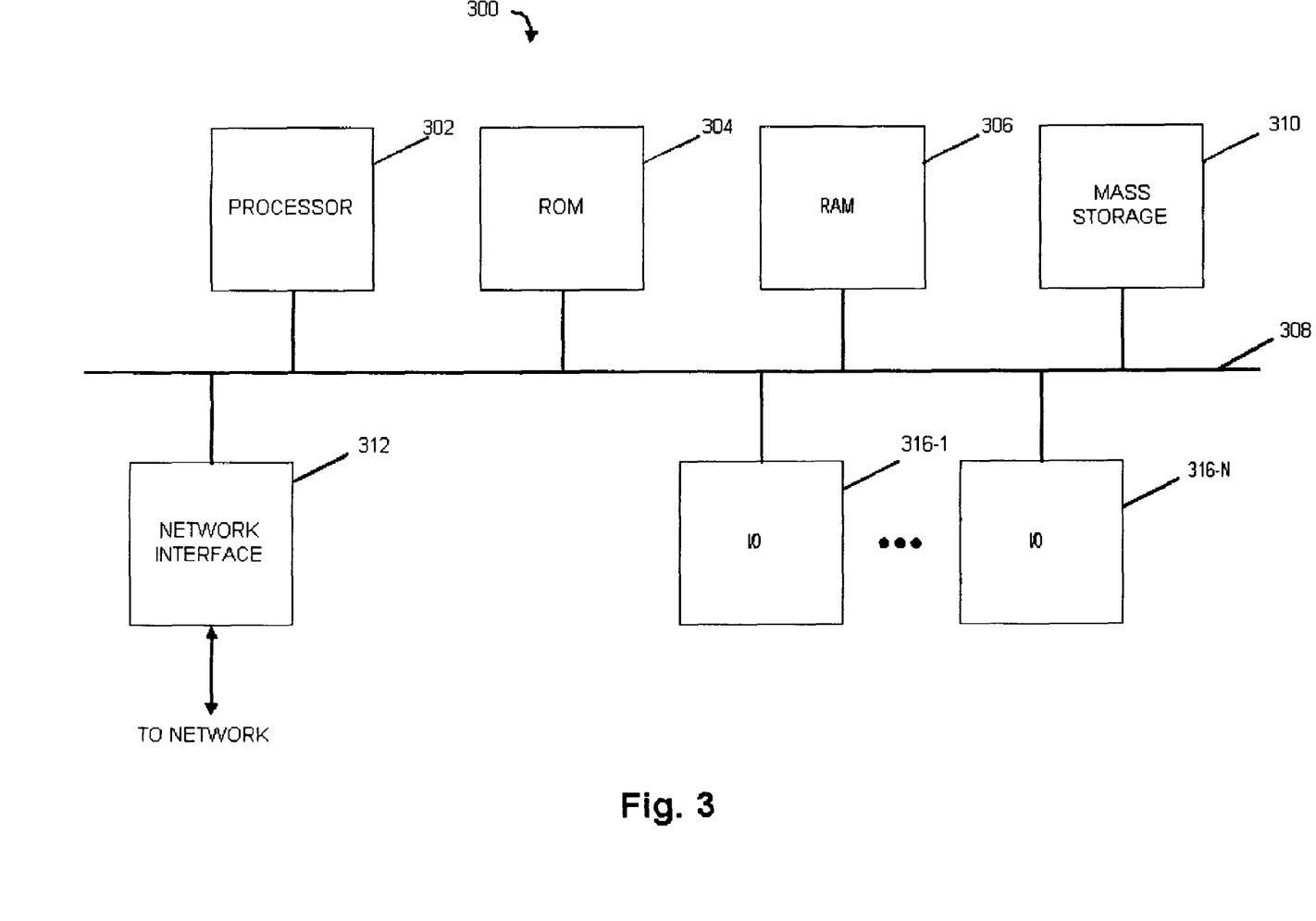
FIG. 3 shows a high-level block diagram of a computer system.

FIG. 3 shows a high-level block diagram of a computer system representative of any of the data processing devices on the network. As shown, the computer system includes a processor 302, ROM 304, and RAM 306, each connected to a bus system 308. The bus system 308 may include one or more buses connected to each other through various bridges, controllers and/or adapters, such as are well known in the art. For example, the bus system 308 may include a "system bus" that is connected through an adapter to one or more expansion buses, such as a Peripheral Component Interconnect ("PCI") bus. Also coupled to the bus system 308 are a mass storage device 310, a network interface 312, and a number (N) of input/output (I/O) devices 316-1 through 316-N.

I/O devices 316-1 through 316-N may include, for example, a keyboard, a pointing device, a display device and/or other conventional I/O devices. Mass storage device 310 may include any suitable device for storing large volumes of data, such as a magnetic disk or tape, magneto-optical storage device, or any of various types of Digital Versatile Disk or Compact Disk based storage.

Figure 4:
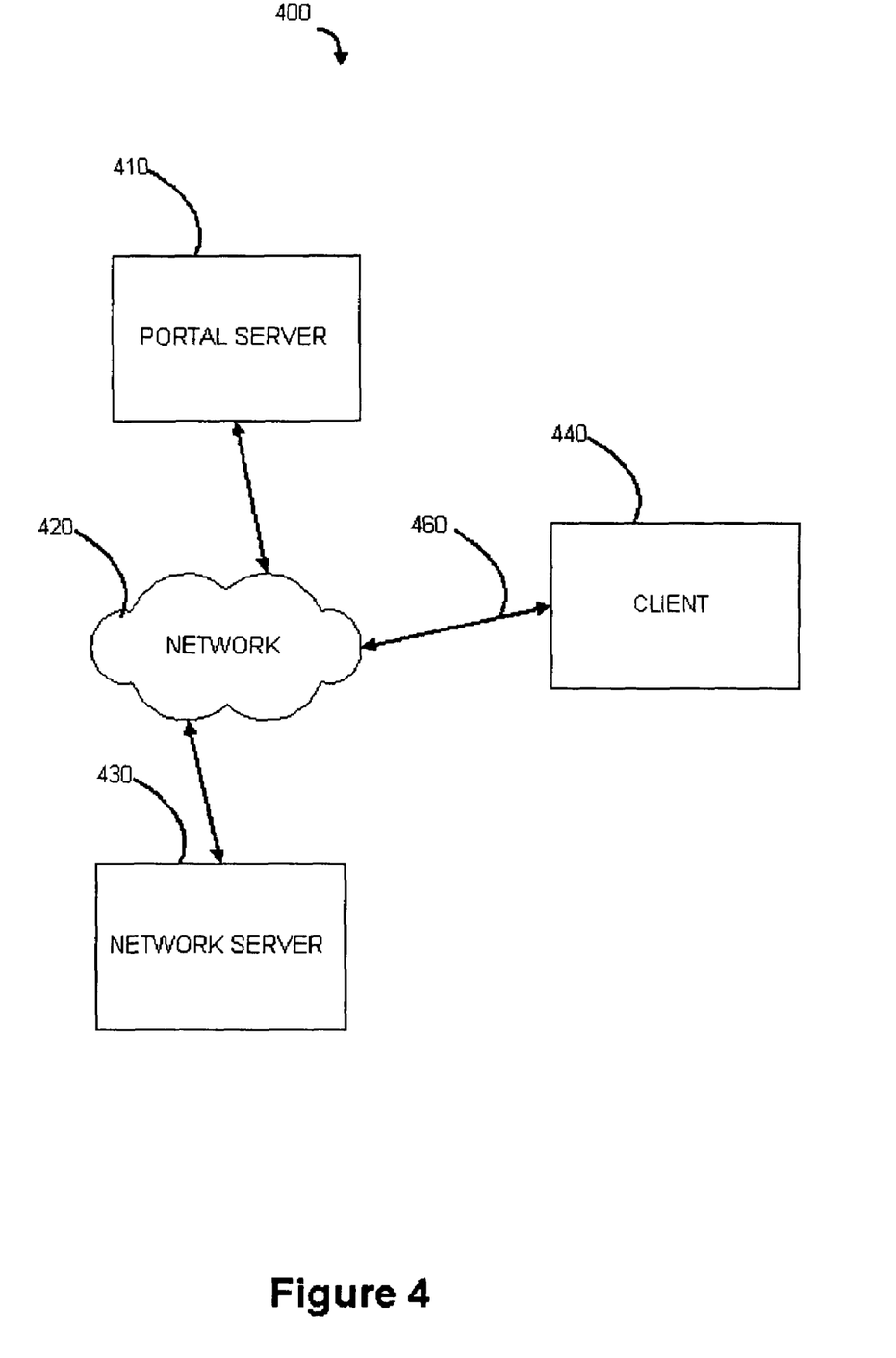
FIG. 4 shows one embodiment of a client-server based architecture.

Network interface 312 provides data communication between the computer system and other computer systems such as via the network 420 illustrated in FIG. 4. Hence, network interface 312 may be any device suitable for or enabling the computer system 300 to communicate data with a remote processing system over a data communication link, such as a conventional telephone modem, an Integrated Services Digital Network ("ISDN") adapter, a Digital Subscriber Line ("DSL") adapter, a cable modem, a satellite transceiver, an Ethernet adapter, or the like. Of course, many variations upon the architecture shown in FIG. 3 can be made while still complying with the underlying principles of the invention.

Elements of the present invention may be included within a client-server based architecture such as illustrated in FIG. 4. A server 410 communicates with client 440 (such as a user terminal) and/or additional network servers 430 over a network 420 (e.g., the Internet). The network 420 over which the clients 440 and servers 410, 430 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 420 including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The server 410 in one embodiment includes a user database for storing various types of user configuration and account data. Users may register and login to the server 410 from a client 440 by specifying a user ID and/or password. According to one embodiment, a user connects to the servers 410, 430 via a browser application such as Netscape Navigator™ or Microsoft Internet Explorer™ which communicates via the Hypertext Transfer Protocol (hereinafter "HTTP").

In one embodiment, users may configure the server 410 to retrieve and manage specific types of information. For example, a user may configure the server 410 to retrieve up-to-date stock quotes for a specified set of stocks (e.g., reflecting the user's portfolio), to collect the weather forecast for the user's hometown, and/or to retrieve recent articles relating to a particular sports franchise. The server will then retrieve the specified information from other servers (e.g., server 430) on behalf of the user.

In addition to information retrieval and management, in one embodiment the server 410 also provides application services such as email, online scheduling (e.g., appointments, to-do lists, etc), instant messaging, contact management, word processing and a variety of other online services. Users may access these services by logging in to the server 410 with a valid user ID and password. In one embodiment, the server 410 generates a unique, personalized Web page for each user containing links to all, or a subset of, the information and/or services subscribed to by the user.

Figure 5:
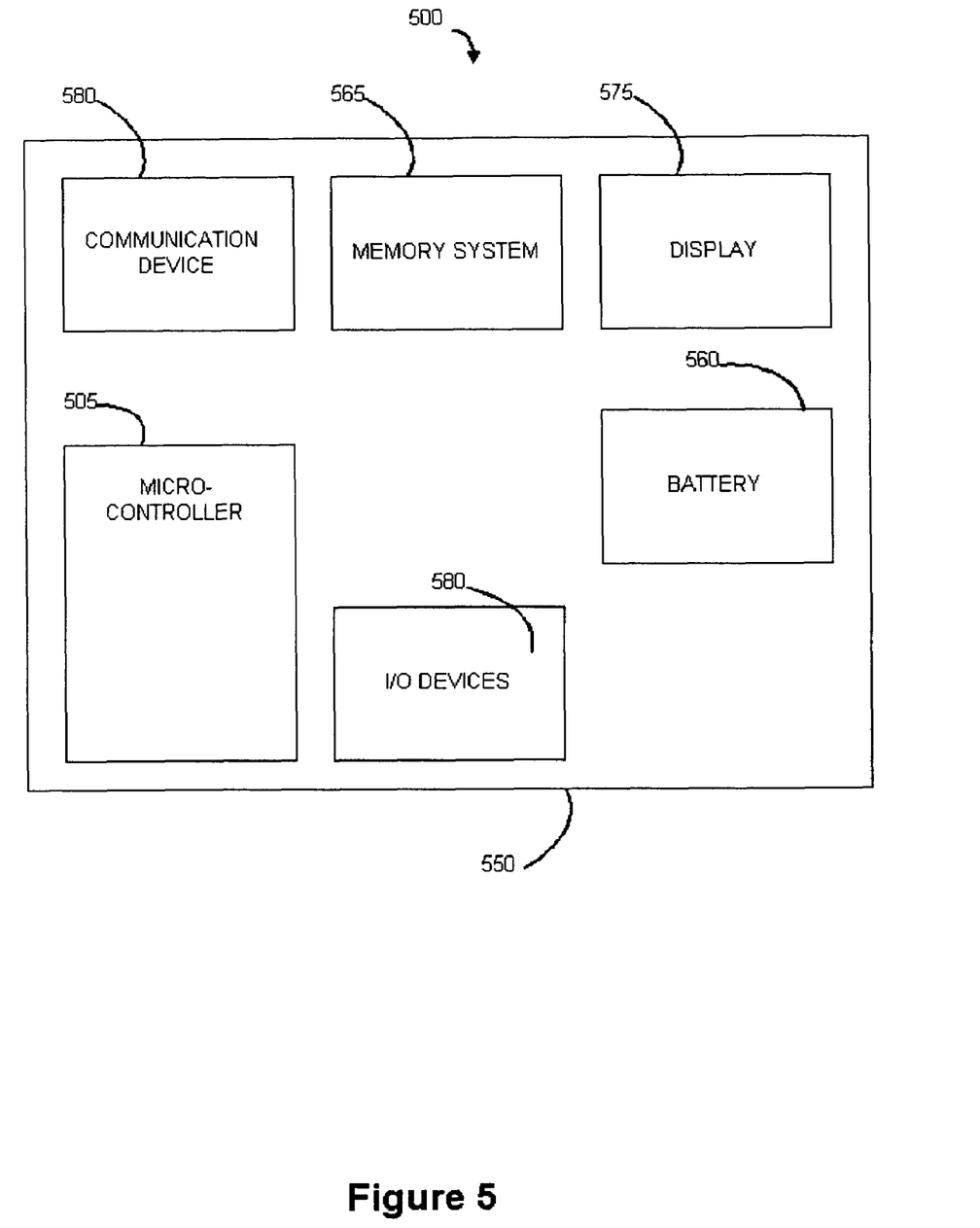
FIG. 5 illustrates one embodiment of a wireless user terminal.
Figure 6:
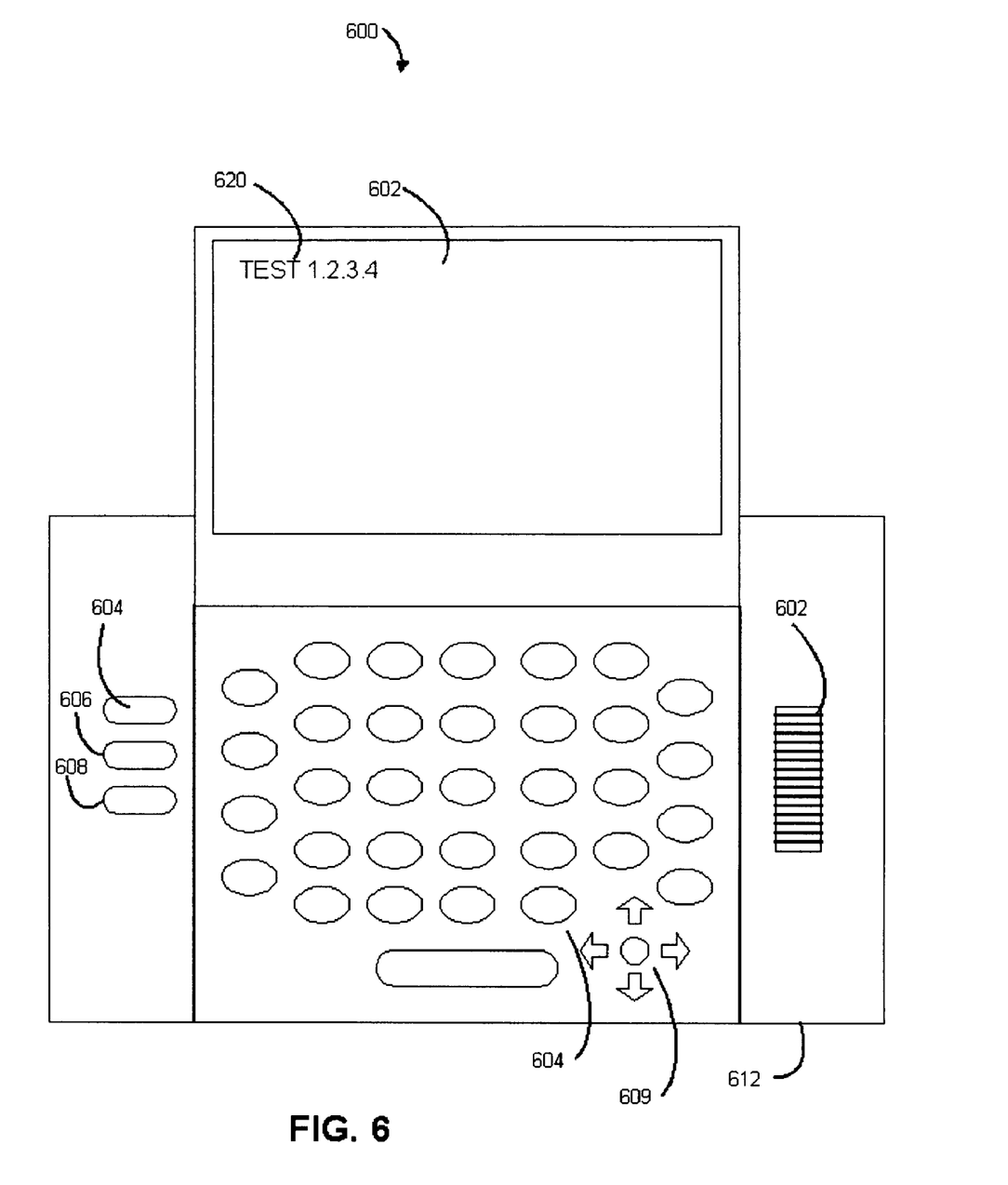
FIG. 6 illustrates an embodiment of a handheld keyboard and display device such as may be used as the wireless user terminal of FIG. 5.

FIG. 5 illustrates an exemplary wireless user terminal on which embodiments of the invention may be implemented. The wireless user terminal 500 includes a microcontroller 505, an external memory 565, a display 575, various I/O devices 580 such as a keyboard, and a battery 560. The external memory 565 may be used to store programs and/or portal data 565 transmitted to the wireless user terminal 500 from the server 410 (e.g., via client 440). In one embodiment, the external memory 565 is non-volatile memory (e.g., an electrically erasable programmable read only memory ("EEPROM"); a programmable read only memory ("PROM"), etc). Alternatively, the memory 565 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the wireless user terminal 500 will notify the user and/or the server 410. The server 410 in one embodiment will then automatically send the user a new battery.

The microcontroller 505 of one embodiment is comprised of a central processing unit ("CPU"), a read only memory ("ROM"), and a scratchpad RAM. The ROM is further comprised of an interpreter module and a toolbox module.

The toolbox module of the ROM contains a set of toolbox routines for processing data, text and graphics on the wireless user terminal 500. These routines include drawing text and graphics on the wireless user terminal's display 575, decompressing data transmitted from the server 410, reproducing audio on the wireless user terminal 500, and performing various input/output and communication functions (e.g., transmitting/receiving data over the client link 460). A variety of additional wireless user terminal functions may be included within the toolbox while still complying with the underlying principles of the invention.

In one embodiment, microprograms and portal data are transmitted from the server 410 to the external memory 565 of the wireless user terminal via a communication interface under control of the microcontroller 505. Various communication interfaces may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module before being executed by the microcontroller 505. One of the benefits of this configuration is that when the microcontroller portion of the wireless user terminal 500 is upgraded (e.g., to a faster and/or less expensive model), only the interpreter module and toolbox of the ROM needs to be rewritten to interpret the currently existing bytecodes for the new microcontroller 505. In addition, this configuration allows wireless user terminals 500 with different CPUs to coexist and execute the same microprograms. Moreover, programming frequently-used routines in the ROM toolbox module reduces the size of microprograms stored in the external memory 565, thereby conserving memory and bandwidth over the client link 460. In one embodiment, new interpreter modules and/or toolbox routines may be developed to execute the same microprograms on cellular phones, personal information managers ("PIMs"), or any other device with a CPU and memory.

One embodiment of the ROM may be comprised of interpreted code as well as native code written specifically for the microcontroller CPU. More particularly, some toolbox routines may be written as interpreted code (as indicated by the arrow between the toolbox and the interpreter module) to conserve memory and bandwidth for the same reasons described above with respect to microprograms. Moreover, in one embodiment, data and microprograms stored in external memory 565 may be configured to override older versions of data/microprograms stored in the ROM (e.g., in the ROM toolbox).

The wireless user terminal 500 may communicate with the server 410 (discussed above) using various RF communication techniques. In one embodiment, the RF communication is established through the communication device 580. In one embodiment, the communication device 580 includes a cellular telephone module that includes at least the radio portion of a cellular telephone that the microcontroller 505 may access for establishing a wireless link to the server 410. The communication device 580 can also include any other similar RF receiver/transmitter combination that will allow the microcontroller 505 to establish a link to the server 410 or other network server such as network server 430. For example, in one particular embodiment, the wireless user terminal 500 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the wireless user terminal is capable of exploiting normally unused bandwidth on a nation-wide, analog cellular network. Embodiments of the wireless user terminal may also be configured to transmit/receive data using a variety of other communication standards including 2-way paging standards and third generation ("3G") wireless standards (e.g., UTMS, CDMA 2000, NTT DoCoMo, . . . etc).

As indicated in FIG. 5, one embodiment of the wireless user terminal 500, the CPU 505 employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the wireless user terminal 500 while still complying with the underlying principles of the invention.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMS, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single server 410, alternative embodiments of the invention may include numerous different servers (e.g., database servers, web servers, etc), and/or mirrored servers distributed across a network. Accordingly, the scope and spirit of the invention should be judged in terms of the claims that follow.

It will be further appreciated that the instructions represented by the blocks in FIGS. 2-2B are not required to be performed in the order illustrated, and that all the processing represented by the blocks may not be necessary to practice the invention.

What is claimed is:

1. A method of managing objects in a user terminal comprising:
   creating an object in a wireless user terminal;
   assigning a first temporary identification (ID) to the object in the wireless user terminal;
   establishing a connection to a server via a network;
   transferring a copy of the object and the temporary ID of the object to the server;
   assigning a permanent ID to the object in the server;
   assigning a second temporary identification (ID) to a copy of edits to the object made in the wireless user terminal prior to the client receiving the permanent ID;
   transferring only the copy of the edits of the object and the associated second temporary ID to the server;
   transferring the permanent ID of the object to the user terminal; and
   updating the object on the server according to the received edits.

2. The method of claim 1, wherein assigning the permanent ID to the object includes:
   storing the permanent ID of the object and the corresponding temporary ID of the object and the corresponding object in the server.

3. The method of claim 1, further comprising:
   transferring the permanent ID of the object and the corresponding temporary ID of the object to the user terminal.

4. The method as in claim 1 wherein the user terminal is a portable data processing device.

5. The method as in claim 4 wherein the portable data processing device is a wireless data processing device and wherein the network, or a portion thereof, is a wireless network.

6. The method as in claim 1 further comprising:
   maintaining an association between the permanent ID and the temporary ID within the server.

7. The method as in claim 6 further comprising:
   receiving modifications to the object at the server, the modifications identified by the temporary ID; and
   identifying the object within the server using the temporary ID.

8. The method of claim 4, wherein creating the object in the wireless user terminal includes editing the object in the wireless user terminal and wherein transferring a copy of the object includes transferring a copy of the edits of the object and an edit ID corresponding to the edits.

9. The method of claim 8, wherein the edit ID includes the ID of the corresponding object.

10. The method of claim 9, wherein the edit ID includes the temporary ID of the corresponding object.

11. The method of claim 9, wherein the edit ID includes the permanent ID of the corresponding object.

12. The method of claim 8, further comprising:
    identifying a second object in the server that corresponds to the edits.

13. The method of claim 12, wherein the second object that corresponds to the edits also corresponds to the same temporary ID as the edits.

14. The method of claim 13, further comprising editing the second object in accordance with the edits.

15. The method of claim 1, wherein the temporary ID is a unique ID.

16. The method of claim 1, wherein the temporary ID includes a time stamp.

17. The method of claim 1, wherein the temporary ID includes a time stamp and wherein the time stamp includes a number of seconds from a predetermined date and time.

18. The method of claim 1, wherein creating the object in the wireless user terminal includes transferring a copy of the created object to a buffer.

19. The method of claim 1, wherein creating the object in the wireless user terminal includes at least one of a group consisting of:
editing the object in the wireless user terminal;
adding the object in the wireless user terminal; and
deleting the object from the wireless user terminal.

20. The method of claim 1, wherein creating the object in the wireless user terminal includes editing the object in the wireless user terminal.

21. The method of claim 20, further comprising:
transferring a copy of the object and a copy of the edits and the temporary ID of the object to a server.

22. A method of managing objects in a user terminal comprising:
creating an object in a wireless user terminal;
assigning a first temporary identification (ID) to the object in the wireless user terminal;
establishing a connection to a server via a wireless network;
transferring a copy of the object and the temporary ID of the object to a server;
assigning a permanent ID to the object in the server;
assigning a second temporary identification (ID) to a copy of edits to the object made in the wireless user terminal prior to the client receiving the permanent ID;
transferring only the copy of the edits of the object and the associated second temporary ID to the server;
updating the object on the server according to the received edits; and
transferring the permanent ID of the object and the corresponding temporary ID of the object to the user terminal.

23. A wireless user terminal comprising:
a processor;
a memory system coupled to the processor, wherein the memory system includes instructions executable by the processor which configure the processor to:
create an object on the wireless user terminal;
assign a first temporary identification (ID) to the object at the wireless user terminal;
establish a connection to a server via a network;
transfer a copy of the object and the temporary ID of the object to the server;
assign a permanent ID to the object in the server;
assigning a second temporary identification (ID) to a copy of edits to the object made in the wireless user terminal prior to the client receiving the permanent ID;
transferring only the copy of the edits of the object and the associated second temporary ID to the server;
transferring the permanent ID of the object and the to the user terminal; and
updating the object on the server according to the received edits.

24. The wireless user terminal of claim 23 wherein the wireless user terminal includes:
a display;
a keyboard; and
a communication device.

25. The wireless user terminal of claim 23 wherein the wireless user terminal includes a cellular telephone.

26. The wireless user terminal of claim 23 further comprising a network coupled to the processor.

27. The wireless user terminal of claim 26 wherein the network includes a wireless network.

28. The wireless user terminal of claim 27 wherein the wireless network includes at least one of a group consisting of:
a CDMA network;
a GSM network;
a cellular digital packet data network;
a third generation wireless network; and
a TCP/IP network.

29. The system of claim 26 further comprising a server and wherein the server is coupled to the network.

30. The system of claim 29 wherein the memory system further includes instructions executable by the processor which configure the processor to:
transfer the object and the temporary ID of the object to the server.

* * * * *